P. F. PROBASCO.
PISTON RING.
APPLICATION FILED SEPT. 1, 1917.
1,271,077.
Patented July 2, 1918.
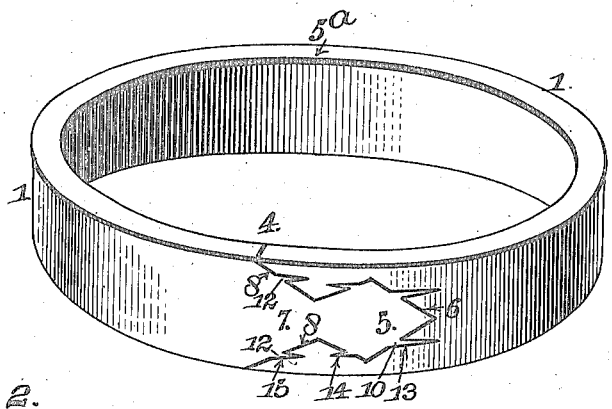
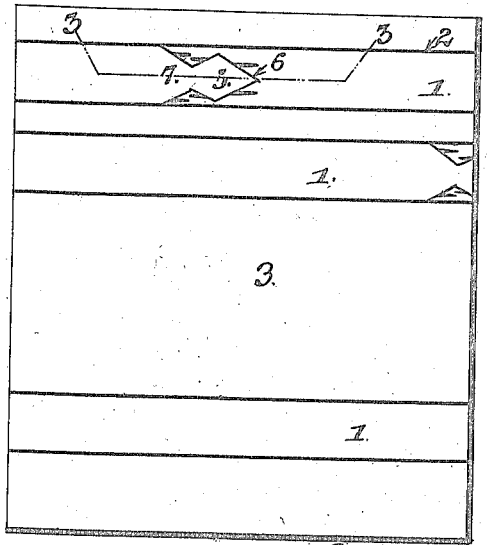
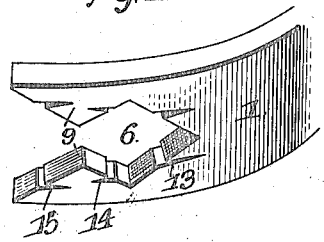
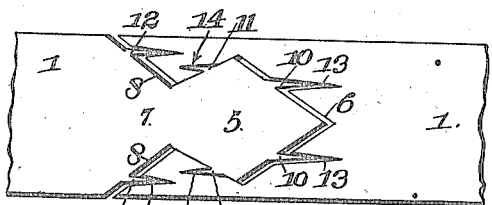
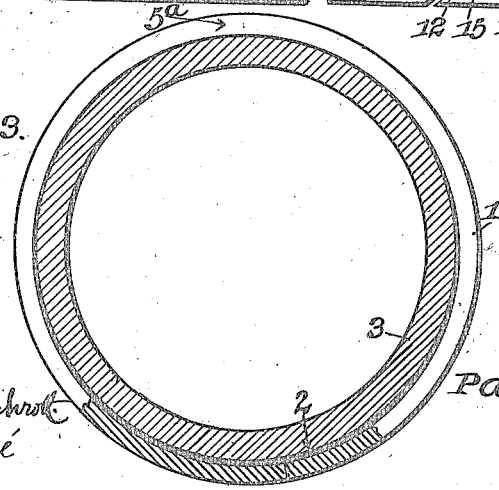
WITNESSES
INVENTOR
Paul F. Probasco
BY
ATTORNEYS

UNITED STATES PATENT OFFICE.

PAUL FRANCES PROBASCO, OF KANSAS CITY, MISSOURI.

PISTON-RING.

1,271,077.   Specification of Letters Patent.   Patented July 2, 1918.

Application filed September 1, 1917. Serial No. 189,363.

*To all whom it may concern:*

Be it known that I, PAUL F. PROBASCO, a citizen of the United States, and a resident of Kansas City, in the county of Jackson and State of Missouri, have invented a new and useful Improvement in Piston-Rings, of which the following is a specification.

My invention relates to improvements in piston rings, and it consists in the constructions, combinations, and arrangements herein described and claimed.

An object of my invention is to provide a piston ring which is provided with a diamond shaped head and a plurality of prongs at one end, and a head recess with prong sockets at the other end, the head and prongs, and the head recess and prong sockets being adapted to fit together when the piston ring is applied to the piston of an engine.

Another object of the invention is to provide a piston ring of the character described, having inter-locking portions provided with prongs which are made sharp in order to cut any carbon which might collect in the co-acting sockets of the prongs.

Another object of the invention is to provide a piston ring having inter-locking portions as described, the body of the ring opposite to where the ring is split and the inter-locking portions are located, being made thicker so that the portions of the ring adjacent to the inter-locking portions being correspondingly thinner, will possess greater resiliency than would otherwise be obtained.

Other objects and advantages will appear in the following specification, reference being had to the accompanying drawing, in which:

Figure 1 is a perspective view of a piston ring constructed in accordance with my invention.

Fig. 2 is a side elevation of a piston, showing a number of the rings applied.

Fig. 3 is a cross section on the line 3—3 of Fig. 2 showing more particularly the varying thickness of the ring.

Fig. 4 is a detail perspective view of one end of the ring showing the head recess and the prong sockets, and Fig. 5 is a detail view of a portion of the ring showing it under expansion.

In carrying out my invention I provide a piston ring 1 which is made preferably of steel or some other similarly resilient metal, which is adapted to be seated in the grooves 2 of a piston 3. The ring 1 is split or separated at the place generally indicated 4, and at a diametrically opposite point 5ª is made thicker so that the ends of the ring 1 adjacent to the region 4 will be accordingly thinner and possess a greater degree of resiliency than the ring would possess were it of uniform thickness throughout.

One end of the split ring 1 is formed into a diamond shaped head 5 which fits into a correspondingly shaped head recess 6 formed in the other end of the ring. The head 5 joins the body of the ring 1 through a neck 7 which includes the surfaces 8 that diverge from the head 5 to the body of the ring. It is easily understood from the drawings, that the co-acting portions of the ends of the rings are shaped to conform one with the other, and it therefore follows that abutment shoulders 9 are formed on that end of the ring 1 having the head recess 6.

A plurality of prongs are formed on the head 5 and neck 7. The head 5 has a pair of prongs 10 on the front and a pair of prongs 11 on the back. The neck 7 has a pair of prongs 12, all of the prongs being sharp in order to cut any accumulations of carbon which might occur in recesses provided for the prongs in the adjacent portions of the ring.

The prongs 10 and 11 fit in prong sockets 13 and 14 respectively, while the prongs 12 fit in prong sockets 15. The prongs 10 at the front of the head 5, are made longer than the prongs 11 and 12 of the other two sets, the formation of the associated parts being clearly illustrated in Fig. 5.

It will also be observed in Fig. 5, that certain of the surfaces are shown in contact while others are out of contact. Fig. 5 is intended to illustrate the approximate relative positions of the parts, when the ring 1 is under expansion. Here it will be seen that the prongs 11 are seated tightly in the prong sockets 14, while the other prongs 10 and 12 are comparatively loose in their respective sockets. It will be understood, that there will always be a relatively tight engagement of some of the prongs to suit the various degrees of expansion of the ring.

The ring 1 is made thicker at the place 5 which is diametrically opposite to the place 4 where the ring is cut. It follows, that the thickness of the ring portions adjacent to the region 4 are thinner than the ring body is at 5. The ends of the ring are, therefore, more resilient than they would be, were the ring of uniform thickness throughout, and the result is, that the ring will press tightly against the walls of the cylinder in which the piston 3 works.

In the application of the device, the piston ring 1 is first fitted to the bore of the cylinder wherein it is to work. The ring is then slipped over the end of the piston 3 and into the groove 2 where it is to rest. The diamond shaped head 5 seats in the head recess 6 and the remaining portions of the ring comprising the various prongs and prong sockets, inter-engage and provide a substantial closure for the ring at the region 4. In applying a number of the rings to a piston, the places 4 will be located about the periphery of the piston so that they will be uniformly separated. The rings may be made narrow or wide, according to the individual requirements. The rings will have to be made relatively wide when applied to pistons of a considerable diameter, and may accordingly be made narrower, when the rings are applied to pistons of a smaller diameter.

The advantages of the device are best demonstrated in the actual application, but it will be understood that the sharp points provided by the different prongs, will serve to cut any carbon that might accumulate in the sockets for the respective prongs. The ring is also leak-proof. The rings in preventing the escape of the compressed gases in the engine cylinder, permit of greater compression, and also prevent lubricating oil from working up past the rings into the combustion chamber.

While the construction and arrangement of the device as illustrated in the accompanying drawing is that of a generally preferred form, obviously modifications and changes may be made without departing from the spirit of the invention or the scope of the claims.

I claim:

1. A piston ring comprising interlocking means including a head on one end of the ring, and inter-engaging means including prongs carried by the inter-locking means, the other end of the ring having means for receiving said inter-locking and inter-engaging means.

2. A piston ring comprising a split metallic band having a diamond shaped head at one end, joined with the ring by a neck having diverging surfaces, and prongs formed on the diverging surfaces and on the surfaces of the diamond shaped head, the other end of the ring being provided with correspondingly shaped prong sockets and a head socket.

3. A piston ring comprising a split metallic band made thicker at a point diametrically opposite to the region of the split, a diamond shaped head formed on one end of the ring and joined with the ring through a neck, sharp prongs formed on the surfaces of the diamond shaped head and the surfaces of the neck, the other end of the ring having correspondingly shaped receiving sockets and recess for the prongs and head respectively.

4. A piston ring comprising a body cut at one side and made thicker on the side diametrically opposite the cut, one end of the body having an interlocking head with prongs, and the other end of the body having head and prong receiving recesses.

5. A piston ring comprising a circular body cut at one side, the ends of the body having sharp interlocking members adapted to cut accumulations of carbon in the interlocking means receiving recesses.

6. A split piston ring having a head on one end and a recess for receiving said head and slightly larger than the head, on the other end, said recess having a plurality of tapering prong recesses, and a plurality of sharp prongs formed on the head adapted to rest in the prong recesses.

PAUL FRANCES PROBASCO.

Witnesses:
JAMES G. INGERSOLL,
J. G. DAVIES.

Copies of this patent may be obtained for five cents each, by addressing the "Commissioner of Patents, Washington, D. C."